Sept. 2, 1958  C. BECKMAN ET AL  2,850,673
AUTOMATIC HEADLIGHT DIMMING SYSTEM
Filed Oct. 14, 1954  3 Sheets-Sheet 1
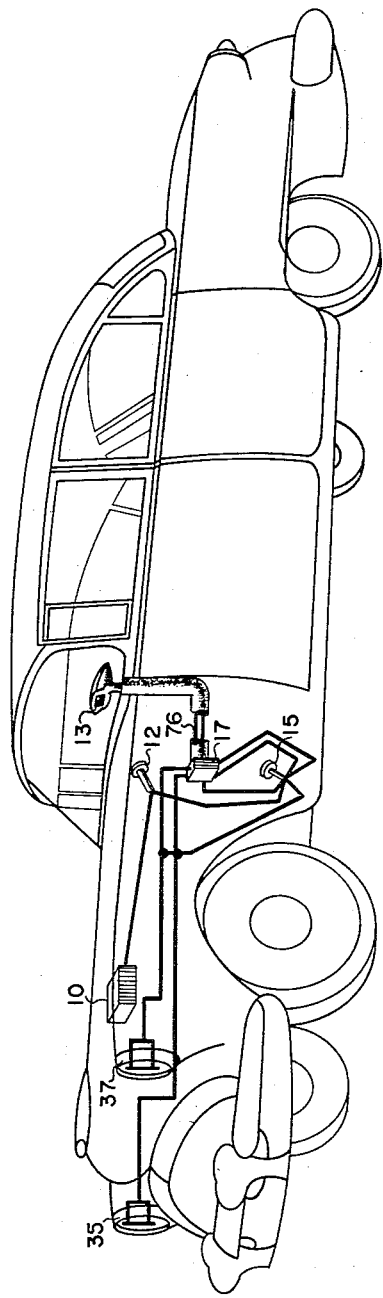
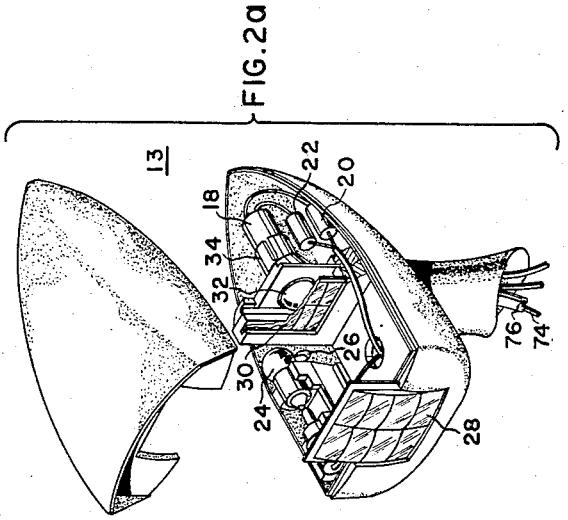
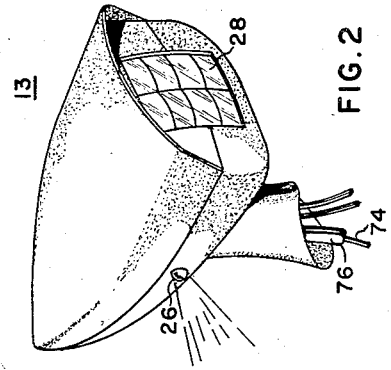
INVENTORS
CARL BECKMAN
DAVID A. STARR JR.
BY
Edward J. Dakin
AGENT Sept. 2, 1958    C. BECKMAN ET AL    2,850,673
AUTOMATIC HEADLIGHT DIMMING SYSTEM
Filed Oct. 14, 1954    3 Sheets-Sheet 2

INVENTORS
CARL BECKMAN
DAVID A. STARR JR.
BY
Edward J. Da Rin
AGENT

Sept. 2, 1958

C. BECKMAN ET AL 2,850,673

AUTOMATIC HEADLIGHT DIMMING SYSTEM

Filed Oct. 14, 1954

INVENTORS
CARL BECKMAN
DAVID A. STARR JR.
BY
*Edward J. Dakin*
AGENT

United States Patent Office 2,850,673
Patented Sept. 2, 1958

2,850,673

AUTOMATIC HEADLIGHT DIMMING SYSTEM

Carl Beckman, Philadelphia, and David A. Starr, Jr., Berwyn, Pa., assignors to Burroughs Corporation, Detroit, Mich., a corporation of Michigan Application October 14, 1954, Serial No. 462,205

5 Claims. (Cl. 315—83)

This invention relates to an illumination control system and particularly to an automatic headlight illumination control system adapted to respond to the lights of approaching vehicles.

Automatic headlight dimming systems have been in the process of development for eliminating the hazards and discomforts of night driving due to the headlights of approaching vehicles and for eliminating the human factor in the control of illumination provided by headlights with high and low light beams. The use of such dimming equipment has introduced problems into their design which may cause the erroneous operation of the headlights or involve new driver techniques, and thereby override the advantages of automatic control. The sensitivity of an automatic headlight dimming system has been largely responsible for the problems and erroneous operation encountered in the use of such systems. Since most systems operate on the total integration of the light in the driver's field of vision, it may be readily appreciated that such automatic systems require a high degree of sensitivity for detecting the foreign source of illumination that is responsible for the discomforture to the operator of the vehicle. Since the integration includes the illumination produced by one's own vehicle as well as that of an approaching vehicle the automatic system also responds to extraneous light sources such as reflections from nearby objects and changes in surface conditions of the road being travelled. A desirable criterion for a fully automatic system requires that once the system has responded to the foreign source of illumination to dim the headlights it be maintained in that condition during periods of varying light intensities as long as the foreign light source is within the driver's field of vision. These variations in light intensities are such that the system may respond to them and produce erroneous operation. The erroneous operation may take the form of oscillations of the headlamps between the high and low beam positions as the controlled vehicle is met by a series of approaching vehicles or by the dimming of the approaching vehicle's lights in response to the change by the automatic system on the controlled vehicle. Therefore, the characteristics of the light sensitive element and the associated circuitry are readily seen to be important factors in the sensitivity response of any automatic headlight dimming system.

The light sensitive cell incorporated in any system must not only meet the requirements as to sensitivity but must also be economically desirable and possess desirable characteristics that will allow it to operate satisfactorily under all conditions that a vehicle encounters in normal use, such as changes in humidity and temperature. Furthermore, in order that any automatic headlight dimming system be economically feasible, the unit must comprise a minimum of associated elements to be commercially acceptable while meeting the aforementioned requirements.

The development of automatic headlight dimming systems have been proposed with light sensitive elements which responded to light sources in such a manner as to provide varying output signals from different types of photocells. Heretofore, these output signals were provided by the types of photocells which generated minute sources of energy requiring amplification in one form or another by thereby materially adding to the complexity and cost of such systems. The use of light sensitive elements that are employed as passive elements in the automatic systems have been investigated and considered as possible desirable components in headlight dimming systems. Such passive types of light sensitive elements are generally termed photoconductive cells and are characterized by varying their resistance with changes of light intensity impinging thereon. The use of photoconductive elements involve problems which are not prevalent in former systems utilizing the aforementioned other types of light sensitive elements and which must be successfully solved in order to provide an acceptable automatic headlight dimming system The resistances of such passive light sensitive elements under "dark" conditions or with no light impinging thereon may be very high and approach the resistance of leakage paths across the cell. These leakage paths may allow stray currents to shunt the cell resulting in a variation of the cell sensitivity and thereby cause erroneous operation of the automatic system. These leakage paths may be an appreciable factor under conditions of varying humidity, for example. By virtue of using a passive element of the character mentioned as the light sensitive element in an automatic headlight dimming system it is possible to vary the sensitivity of the system by simple and efficient means to maintain the headlights in the automatic dimmed position while subject to varying light intensities. Furthermore, in order that any automatic system be acceptable, it should not involve any new driving techniques and it is therefore desirable to maintain the manual switching controls to a minimum. It is further desirable that any manual control be characterized by being able to override the automatic control system to allow the operator to be in command of the headlights and also maintain the headlight illumination without being dependent on the automatic portion of the illumination system for energization.

It is, therefore, a general object of the invention to provide an improved automatic headlight dimming system.

It is an important object of the invention to provide an improved automatic headlight dimming system capable of acceptable operating performance with a minimum of associated equipment.

It is another important object of the invention to provide an improved automatic headlight dimming system which requires no new driver techniques and employs a single unitary manual control device for both automatic and manual control.

It is still another important object of the invention to provide an automatic headlight dimming system utilizing a passive electrical element as the light responsive element.

It is yet another important object of the invention to provide an economical automatic headlight dimming system utilizing an improved method for varying the sensitivity of the system in combination with the photoconductive light sensitive element once the latter has detected a foreign light source.

The above and other objects are accomplished by providing an automatic headlight dimming system utilizing a photoconductive element in a novel circuit arrangement to control a relay for switching between the high and low beam filament positions of the headlights. The automatic system is energized by means of a single manual control device which allows the operator of the vehicle to override the automatic system rapidly. The sensitivity of the system is instantaneously varied on response of the system to a foreign source by inhibiting the variations produced as a result of the light impinging on the photoconductive element as long as the source is within the driver's field of vision.

Other objects and features of advantage of the present invention will be found throughout the following more detailed description of the invention particularly when considered in connection with the accompanying drawings, in which like reference numerals indicate like elements.

Fig. 1 is a perspective view of a vehicle equipped with the automatic headlight dimming system and illustrating the relative positions of the basic units in accordance with the invention;

Fig. 2 is a perspective view of the pick-up unit of the invention;

Fig. 2A is a perspective view of the pick-up unit of Fig. 2 showing the cover plate displaced and the internal arrangement of parts, some of which are partly in section in order to expose other parts which would otherwise be concealed;

Figure 3:
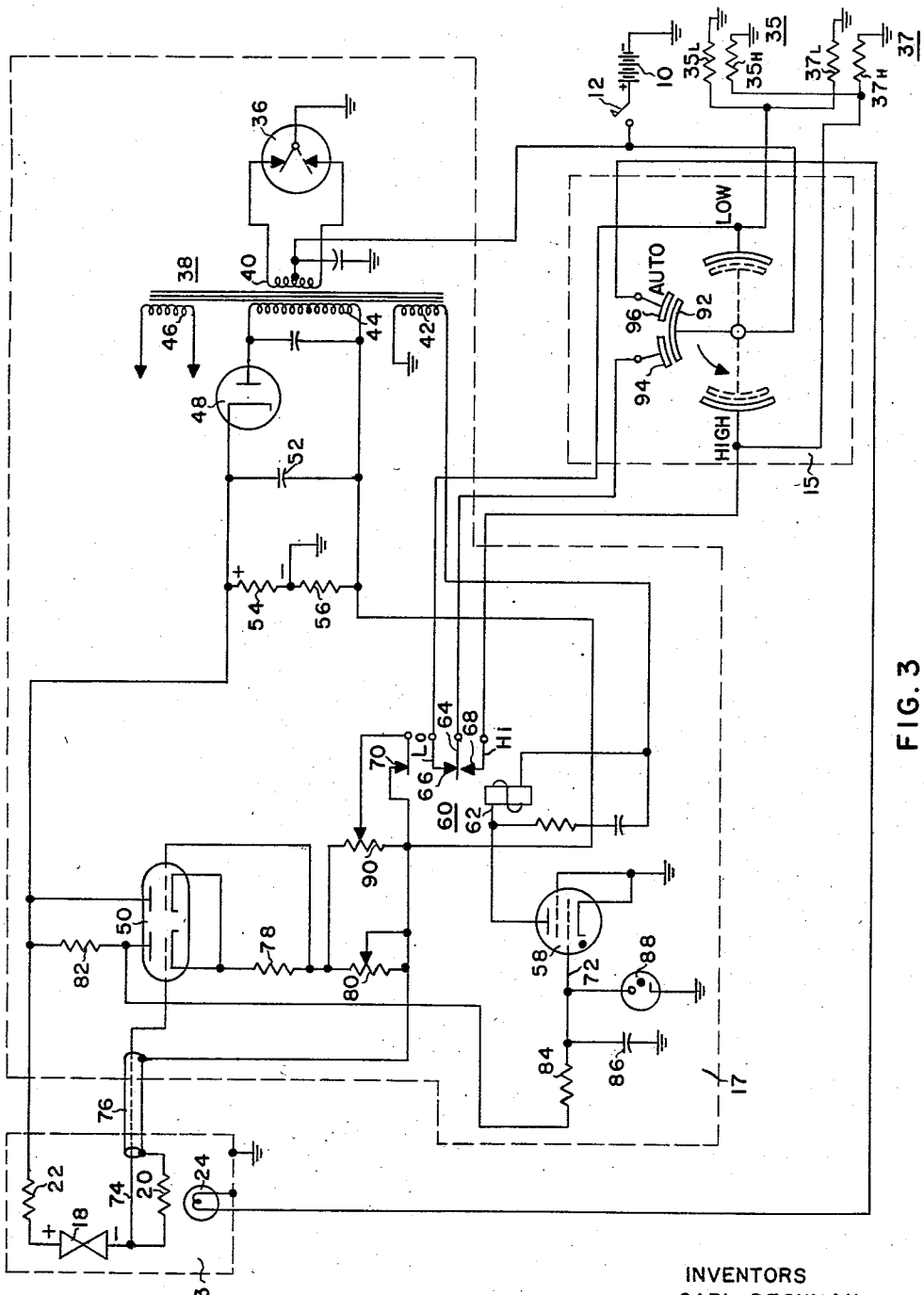
Fig. 3 is a diagrammatic illustration of the control circuit for the automatic control system constructed in accordance with the invention.

Now referring to Fig. 1, the general location of the various units will be described as they may be installed in a vehicle. The entire automatic headlight system illustrated by way of example herein is designed to operate on a standard 6 volt vehicle battery 10 as a source of power. It is to be understood, however, that the system may be readily adapted for vehicles operating on 12 volts and other low voltage systems. The battery 10 may provide the source of energy for the ignition system, radio, etc. of the vehicle as well as the automatic headlight dimming system. The manual energization of the headlights as well as the automatic control system is controlled by the usual type headlight-parking light switch 12 which may be located on the instrument panel of the vehicle. The automatic headlight dimming system may comprise as in this instance, three basic units respectively identified by the odd number reference characters as the pick-up head 13, the control switch 15 and the control unit 17.

The pick-up head 13 may be located in any convenient position on the vehicle in order to detect the field of vision of the driver. The pick-up head 13 in this instance is preferably positioned within the vehicle and nearly in line with the driver's eye. For example, it may be positioned on the instrument panel of the vehicle and slightly to the left of the center line of the steering mechanism. The pick-up head is generally identified in Fig. 1 by the reference character 13 as it is located in the aforementioned position. The second basic unit of the system consists of a manual or foot control switch 15. The control switch 15 may be located in the same general position that the conventional two position foot controlled headlight switch is located in a vehicle that is not equipped with an automatic headlight dimming system, that is, on the floor adjacent the clutch pedal or steering post of the vehicle. The foot switch 15 is arranged to successively control the system from an automatic position to high beam position and then to low beam position of headlight illumination and thereby allow the operator to switch from an automatic low beam position to the manually controlled high beam position. The specific function of the foot switch 15 will be described more fully hereinafter. The remaining elements of the control system are grouped into a package identified as the control unit 17. The control unit 17 is illustrated in Fig. 1 as being located under the hood and abutting the firewall of the vehicle and preferably as close to the pick-up head 13 as possible.

Referring more specifically to Figs. 2 and 2A wherein the pick-up head 13 is illustrated with the top cover portion in position and removed in the respective views. Generally, the pick-up head 13 houses the optical system along with the light sensitive element 18 and a pair of companion electrical resistors 20 and 22. There is also positioned within the pick-up head 13 a visual means for indicating to the operator when the control switch 15 is in the automatic position for controlling the illumination of the headlights. A low wattage light bulb 24 is arranged within the housing on the side toward the vehicle's operator and near to the rear of the housing as illustrated in Fig. 2 by the emission of light flux through an aperture 26 to provide the aforementioned indication. To protect the light sensitive element 18 from the light emitted by the bulb 24, a light shield may be provided in the housing between the two elements. For purposes of clarity, the shield is omitted from Fig. 2A.

The optical system housed in the pick-up head 13 is arranged to detect the area of the driver's field of vision which may be substantially equivalent to the area covered by the light rays when the head lamps are in a high beam position, for example. The optical system consists of the lenses 28, 30 and 32. The lens 28 is positioned in the front portion of the pick-up head 13 and approximately centrally thereof. The lens 30 is substantially similar to the lens 28 and is positioned in line with the lens 28 at a point behind the aperture 26. The third lens 32 is positioned directly behind the lens 30 and acts as a condensing lens for the light sensitive element 18. The lens 32 is positioned within the front portion of a tubular cell sleeve 34 which also retains the light sensitive element 18.

Now referring to Fig. 3, the detailed operation of the automatic headlight dimming system will be explained. The circuit operation will be described by assuming the foot switch 15 has first been placed in the automatic position which is designated by the legend "Auto" in the figure. With the placing of the foot switch 15 in the automatic position and the closing of the headlight control switch 12 energy is supplied to the headlights 35 and 37 by means of the automatic dimming control system from the vehicle battery 10. The vehicle battery also is connected to a standard commercially available auto radio vibrator 36 to provide the power for the electronic devices. Upon thus energizing the electronic devices of the automatic system the headlights are prepared for automatic control.

The direct current voltage from the battery 10 is converted to a high voltage alternating current by the action of the vibrator 36. The alternating current output of the vibrator 36 is directly connected to a power transformer, generally identified by the reference character 38. The power transformer 38 comprises a single primary coil 40 and a plurality of secondary coils, identified by the reference characters 42, 44, and 46. The secondary coil 44 is connected to a rectifier element 48 which rectifies the alternating current to provide the high voltage direct current supply for the electronic tube 50 in combination with the filtering capacitor 52. The resistors 54 and 56 connected to the line between the elements 48 and 50 provide a voltage divider network across the direct current supply. The transformer secondary coil 42 provides the alternating current plate supply voltage for a control tube 58. The secondary coil 46 is utilized as the filament supply for the electronic tube 50.

The illumination of the headlights is controlled by means of the relay 60 which in turn selects the circuit for energizing the high or low beam filaments. The relay winding 62 is connected in series with the anode of the control tube 58 and the secondary winding 42 of the power transformer. The relay winding 62 is operable to control a movable armature 64 between a pair of contacts 66 and 68. The contact 66 is connected to energize the low beam filaments 35L and 37L of the headlights while the contact 68 energizes the high beam filaments 35H and 37H. An additional contact 70 which may be identified as the hold contact is also provided with the relay 60. The contact 70 is normally closed as is the contact 66 when the relay winding 62 is de-energized and the two are operated simultaneously.

The use of a grid actuated control tube adapted for relay service sufficiently sensitive to respond to the control signals yet providing sufficient power output to energize a relay has been found to be advantageous. The use of a control tube having the characteristics of the commercially available thyratron allows the use of a single power relay to replace a sensitive relay and a power relay. The light sensitive element 18 is arranged in the automatic headlight dimming system to provide a bias voltage for the control tube 58 to allow it to conduct and thereby the relay winding 56 to become energized when the element 18 is "dark" to position the headlights in high beam.

Since the light sensitive element 18 is a passive circuit element the changes in its resistance with differing light intensities can be taken advantage of in the control circuitry of the headlight system. The light sensitive element 18 is arranged under "dark" conditions or no light impinging thereon to allow the control tube 58 to conduct by means of controlling the bias on the control grid 72. Therefore, since the relay 60 is connected in series with the control tube 58 it is energized under the aforementioned light conditions and provides energy to the high beam filaments through the closing of the battery supply circuit by means of the closed relay contact 68. The change in resistance of the light sensitive element 18 in response to a foreign light source of a predetermined intensity which would be uncomfortable to the vehicle's operator causes the automatic system to respond in turn by varying the bias on the control tube 58 to de-energize the tube and relay 60 to allow the armature 64 to mate with the contact 66 in series with the low beam filament energization circuit to provide low beam illumination.

The light sensitive element 18 is electrically connected across the high voltage direct current source. The positive terminal of the voltage source located at the topmost terminal of the divider resistor 54, as illustrated in Fig. 3, is connected to the light element 18 through the series current limiting resistor 22. The resistor 22 is proportioned to limit the current through element 18 to some safe value in instances where an extremely bright light may be detected (e. g. sunlight). The opposite end of the light sensitive element 18 is connected to the negative side of the direct current supply and also by lead 74 to the control grid of the double triode electronic tube 50. The electrical connection 74 is preferably run through a shielded cable or coaxial cable identified by the reference character 76. The other electrical connection of the sensitive element is made to the resistor 20 and thence to the conductive sheath of the cable 76 in series with the resistor 20. The resistance of the resistor 20 is matched to produce a given signal output for low beams at the desired operating distance. The purpose of making the connection in this fashion will be evident from the description hereinafter. Therefore, it may be readily appreciated that any change of current flow through the light sensitive element 18 causes a change in potential across the resistor 20 and thereby a change in bias on the left hand section of the double triode tube 50. The bias on the left hand section of tube 50 is also governed by the series arrangement of the cathode resistors 78 and 80 and the right hand section of tube 50. The cathode of the right hand section of the tube 50 is connected to the positive or topmost side of the resistor 78 while the grid of same is connected to the negative side of the resistor 78. This arrangement of the right hand section of the tube 50 provides a constant bias for the opposite tube section. It may be readily appreciated that this may be provided by other well known electrical techniques so as to eliminate the need for an extra tube or tube section as in this instance. It has also been found that the constant bias source may be eliminated depending on the characteristics of the light sensitive element employed.

The resistor 80 is a variable device and may be termed the sensitivity adjustment. The setting of the resistor 80 may determine the maximum distance that a foreign light source of a pre-selected intensity impinging on the light element 18 will cause the automatic control to respond by switching the headlights to the low beam filaments. The resistor 80 may be set to allow the detection of an approaching vehicle operating on its high beam filaments at a range of approximately 0.4 to 1.4 miles, for example. Upon the detection of the disturbing light source the resistance of the light element 18 is decreased and thereby the current through it and the resistor 20 is increased. The change in bias caused thereby results in a change in anode current in the tube 50 which is coupled to the grid of the control tube 58 by means of the anode resistor 82. The control grid of the tube 58 is connected to the negative side of the anode resistor 82. The bias on the tube 58 is further governed by the divider resistor 54. The voltage differential between the voltage developed across the anode resistor 82 and the voltage across the divider resistor 54 substantially determines the bias on the grid of the control tube 58. Since the circuit is arranged to cut-off or de-energize the control tube 58 on the detection of the foreign light source the voltage differential provided in that instance is negative. Under "dark" conditions there is a small voltage across the anode resistor 82 and the bias on the control tube 58 is largely governed by the positive voltage provided by the divider resistor 54. The "dark" conditions hereinabove referred to are readily seen to include light intensities up to the intensities that will provide a cut-off bias for the control tube 58. The arrangement of a resistor 84 and a capacitor 86 in the grid circuit of the tube 58 merely provide a noise filter for the circuit. The element 88 is a neon limiter tube which limits the grid bias to the cathode voltage.

Once the system has responded to the disturbing light source, it is desired to maintain the headlights in the low beam position as long as the source or sources producing equivalent light intensities is within the driver's field of vision and to immediately return them to high beam when the source has left the field of vision. This may be more fully appreciated when it is recalled that in a manual headlight control system once the operator has dimmed his vehicle's headlights he maintains that level of illumination in anticipation that the operator of the approaching vehicle will respond by dimming his headlights. The change in illumination produced by the approaching vehicle switching to the low beam is substantial, in the range of 10:1, and would cause the control system to switch back to the high beam filaments. Therefore, it is necessary to provide some means of increasing the sensitivity of the system during these periods to assure the headlights are maintained in the dim position. In this instance the change in bias level caused by the lowered light intensity on the light element is compensated for or "inhibited" to present substantially the same bias to the control tube 58 as when the approaching vehicle was operating on the high beam filaments.

The hold contact 70 associated with the relay 60 is closed simultaneously with the closing of the contact 66 to the low beam filaments. The closing of contact 70 inserts the hold resistor 90 in parallel with the sensitivity adjustment resistor 80. The hold resistor 90 is adjusted to a resistance below the sensitivity adjustment resistor 80 and so proportioned it maintains the voltage across the anode resistor 82 approximately constant and thereby the bias on the control tube 58 below the cut-off potential. Upon the light source leaving the driver's field of vision the control tube 58 is permitted to conduct and the enerigzation of the relay 60 will place the headlights back onto the high beam filaments. The hold resistor 90 may also be a variable device and varied to control the over-all sensitivity of the control system, but only in the "dim" position.

An important feature of the automatic control system is the use of the cable 76 in coupling the light sensitive element 18 to the tube 50. It has been found that erroneous operation of the system will result due to leakage currents shunting the light element 18 especially on humid days. These leakage paths and also extraneous electrical noise such as from the vehicle's ignition system or radio will result in spurious signals. As hereinabove mentioned, the lead 74 which couples the light element 18 to the grid of tube 50 is passed through the cable 76. If the lead was not passed through the cable 76 the leakage current paths would flow from the positive side of the high potential supply to the lead 74. To prevent the leakage current from taking this path, it is directed to the outside sheath of the cable 76 which is connected to the negative side of the direct current supply. Furthermore, the resistor 20 is proportioned to allow the lead 74 to be maintained at a higher potential level than the sheath, but at a level (i. e. —1½ volts) which does not permit current flow between the lead 74 and the sheath of cable 76. It may readily be appreciated that this provides a path for the leakage currents from the high potential supply to the sheath and thereby preventing spurious signals. Furthermore, a distinct advantage obtained by this arrangement is the fact that the degree of shielding provided in this manner enables the tube 50 to be positioned at a distance from the light element 18 and thus in the control unit 17 for example, rather than in the pick-up unit 13.

Another important element of the automatic control system is the pressure actuated foot switch 15 which is diagrammatically represented in the dotted outline in the lower right hand portion of Fig. 3. The foot switch is arranged to cyclically traverse three separate positions as shown by the direction of the arrow, and thereby electrically connect the headlights of the vehicle in either the automatic control position or in the manual high and low beam positions respectively. The common or wiper arm 92 is directly connected to the battery 10 of the vehicle in series with the headlight switch 12. Therefore, when the wiper arm 92 is manually positioned in either the high or low beam position the headlamps are energized directly through the switch and they do not require any portion of the automatic switching system to keep them energized and thereby assuring positive illumination. When the wiper arm is moved to the automatic position it engages the contact 94 and connects the automatic headlight dimming system into the headlight circuit. Furthermore, this cyclical arrangement is advantageous in instances where it is desired to signal an approaching vehicle to switch its headlamps to low by switching from the automatic position to high and then back to low and then to automatic. This arrangement is similar to the normal two position switch and, therefore, does not involve any new driving techniques.

The foot switch 15 is also provided with an auxiliary contact in the automatic position. When the foot switch is positioned in the automatic position it also energizes the auxiliary contact 96 which allows the indicator lamp 24 to become illuminated and provides a visual indication to the operator that the headlights are being controlled automatically.

Figure 4:
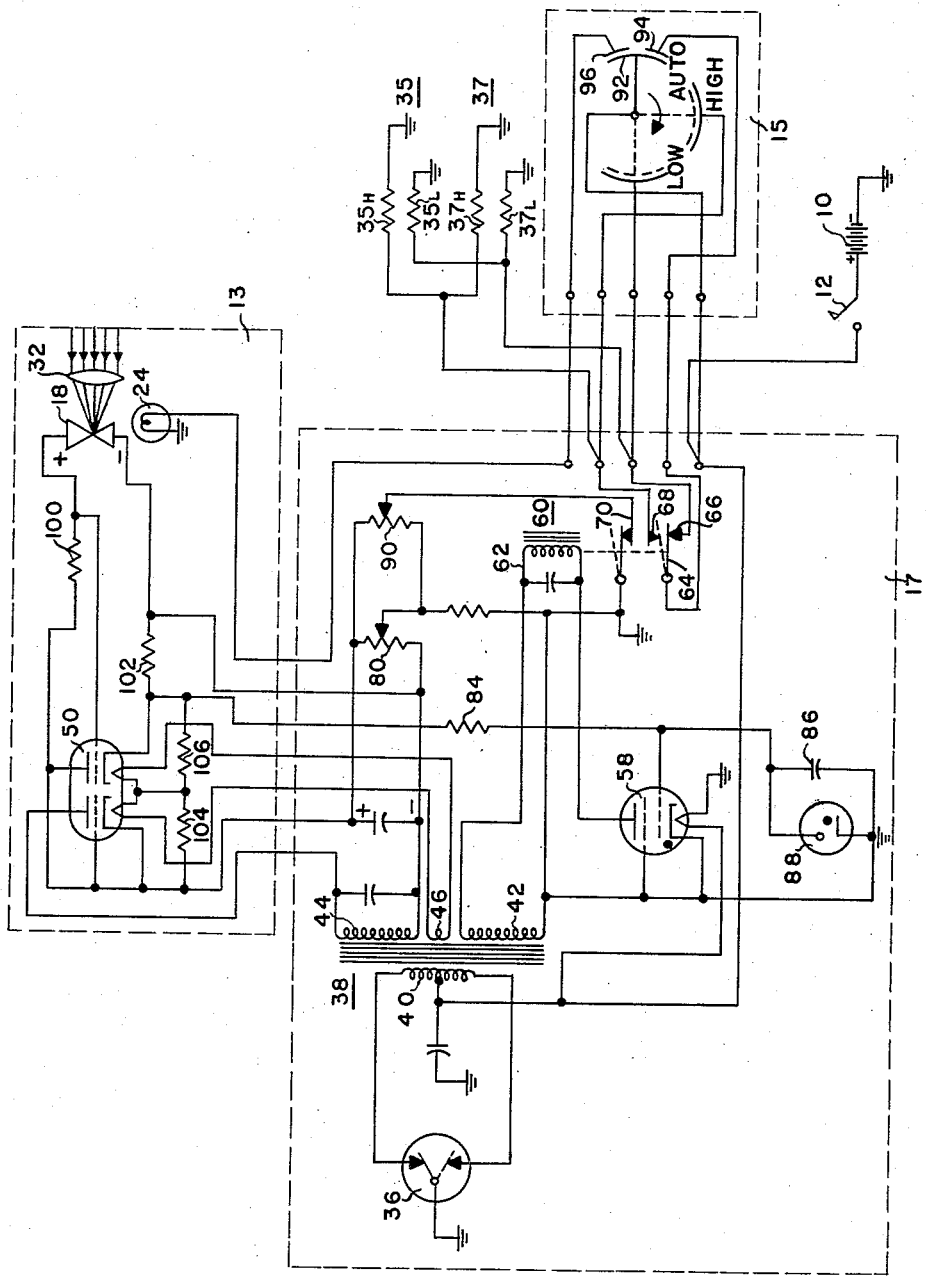
Fig. 4 is a diagrammatic illustration of another embodiment of the control circuit.

Now referring to Fig. 4, detailed circuit operation of another embodiment of the invention will be described. Generally, the operation of the schematic circuit diagram illustrated in Fig. 4 is similar to the operation of the circuit described in connection with Fig. 3. In this instance, however, no voltage amplifier is used between the light sensitive element 18 and the control tube 58 and instead an impedance matching network is employed therebetween to control the bias on tube 58. The light sensitive element 18 and its associated circuit has been found to generate a high impedance signal which must be stepped down to provide a low impedance signal for the grid of the control tube 58. Also the left hand section of the double triode 50 as illustrated in Fig. 4 is utilized as the direct current rectifier in combination with the power transformer 38.

The step down of the impedance is accomplished by arranging the right hand section of the tube 50 as a cathode follower circuit. The light sensitive element 18 is connected between the anode and the cathode of the cathode follower unit. The resistor 100 is connected in series relationship with the anode of the cathode follower and the light sensitive element 18 and presents a high impedance in the order of 400,000,000 ohms. Similarly, the resistor 102 is connected in series with the cathode circuit of the cathode follower. The grid of the cathode follower section of the tube 50 is connected to the light sensitive element side of the resistor 100. This arrangement of the resistors 100 and 102, therefore, forms a voltage divider network for the control tube 58. The control grid of tube 58 is connected to the cathode side of resistor 102 in series with the noise filtering resistor 84 with which is associated the capacitor 86, as in the embodiment illustrated in Fig. 3. The resistive variations of the light sensitive element are coupled to the grid of the control tube 58 by means of the resistor 102. Upon the detection of the foreign light source within the driver's field of vision, the electrical resistance of the light sensitive element 18 will decrease. The decrease in resistance of the element 18 will cause the input to the cathode follower section of the tube 50 to become more negative. As a result, the output of the cathode follower is in turn driven negative to the point where it extinguishes the control tube 58 and thereby de-energizes the relay winding 62. Upon the de-energization of the relay winding 62 the headlights are switched into the low beam position. As in the previous embodiment the hold resistor 90 is simultaneously inserted into the circuit and retains the headlamps in the low position of illumination until the light source leaves the driver's field of vision.

The left hand section of the tube 50 is arranged as a rectifying element for the automatic headlight dimming system to provide the high voltage direct current for the electronic devices. The rectifier is energized from the secondary winding 44 of the power transformer 38. The primary winding 40 of the power transformer 38 is energized from the standard vibrator 36 as in the circuit of Fig. 3. The remaining potentials for the system are provided by the secondary windings 42 and 46. The arrangement of the resistors 104 and 106 in the filament circuit of the rectifier section of tube 50 provides a filter for same.

While it will be understood that the circuit specifications of the automatic headlight dimming system constructed in accordance with the invention might vary according to the requirements for any particular vehicle, the following circuit specifications for the circuit of Fig. 3 are included by way of example only.

| | |
|---|---|
| Tube 48 | Type 6X4. |
| Tube 50 | Type 12AX7. |
| Tube 52 | Type 2D21. |
| | B+ 400 v. (approx.). |
| Resistor 22 | 3,300,000 ohms. |
| Resistor 64 | 2,700 ohms. |
| Resistor 66 | 10,000 ohms. |
| Resistor 68 | 470,000 ohms. |
| Resistor 70 | 22,000 ohms. |
| Resistor 72 | 120,000 ohms. |
| Resistor 74 | 3,000 ohms. |

The resistor 20 is matched for each light sensitive element. In this instance, a photocell element commercially identified as a cadmium sulphide cell and manufactured by Standard Piezo Co. of Carlisle, Pennsylvania, was used and the resistor 20 had a value of 2,200,000 ohms.

It is therefore apparent from the above description that an improved automatic headlight dimming system utilizing a photoconductive light sensitive element has been realized with a minimum of equipment to provide both automatic and manual control of the illumination. An important feature of the automatic system is the variation of the bias in the photoconductive light sensitive circuit simultaneously with energization of the low beam filaments to prevent oscillation of the system between the filaments with varying light intensities.

What is claimed is:

1. An electrical control system for vehicle headlights equipped with high and low beam filaments comprising, in combination, a source of electrical energy, a three position foot switch for manually selecting the high and low beam filaments and for providing automatic selection of same, the three position foot switch including at least a single contact for each position and a contact arm cyclically movable to each position, means for electrically connecting the movable contact arm to the source of electrical energy, means electrically connecting the high beam filaments to the contact at a first of said positions, means electrically connecting the low beam filaments to the contact at the next position, an electrical control circuit for automatic selection of either the high or the low beam filaments, means electrically connecting said control circuit to the contact at the third position, the electrical control circuit including a light sensitive element and a relay having an energizable winding and an armature controlled switch and further including amplifying means for controlling the actuation of said relay and proportioned to cause its armature controlled switch to connect the high beam filaments to the source of electrical energy when the light sensitive element is dark and to cause the switch to connect the low beam filaments to the source of electrical energy when a given light intensity impinges on said element.

2. In a headlamp having high and low beam filaments; a source of filament power connectable thereto; a light responsive circuit for automatic selection of said high and low beam filaments; manual switching means connected between the source and said filaments and including a contact arm cyclically movable in one direction to each of three positions; means electrically connecting the high beam filaments to one of the contact positions; means electrically connecting the low beam filaments to the next successive contact position; and means electrically connecting said light responsive circuit to the third successive contact position; said light responsive circuit comprising in combination, a photo-conductive element characterized by changing conductivity by action of light; an electron device having a control, anode and cathode electrodes; an amplifier having anode, cathode and control electrodes, connected to couple a change of potential resulting from variation of conductivity of said photo-conductive element to said electron device; relay means connected to be activated by current flowing in the anode circuit of said electron device; means for supplying unidirectional voltage for operation of said light responsive circuit; a voltage divider comprising resistance effectively connected across said means for supplying voltage; connections from electrodes of said amplifier to said voltage divider for furnishing operating potentials to said electrodes; first and second adjustable control resistors included in said light responsive circuit to respectively select separate threshold response levels to foreign light when the circuit is in a light receptive and non-light receptive condition, and contacts in said relay means arranged to short at least a portion of one of said resistors, whereby actuation of said relay means in one direction automatically chooses one of said resistors to change the threshold in a direction causing greater sensitivity after a foreign light beam is received exceeding the threshold level established by the other of said control resistors, and whereby actuation of said relay means in the other direction automatically chooses the threshold level established by the said other of said control resistors.

3. In a system for operating a headlamp having high and low beam filaments, the combination comprising, a source of power for said filaments, manual switching means for selectively connecting the source to either of said filaments, a light responsive circuit for automatic selection of said high and low beam filaments in response to presence or absence of a foreign light source exceeding a predetermined intensity for selective connection by said manual switching means to said filaments, said manual switching means including an arm cyclically movable to each of three contact positions, means electrically connecting the high beam filaments to one of the contact positions, means electrically connecting the low beam filaments to the next successive contact position, and means electrically connecting said light responsive circuit to the third successive contact position, said light responsive circuit including a photo-conductive element characterized by a change of conductivity in response to impingement of radiant light energy, a first amplifier device having a control, output, and reference electrodes, a second amplifier likewise having control, output, and reference electrodes and connected for response to variation of conductivity of said photo-conductive element, a circuit coupling the output electrode of said second amplifier to the control electrode of said first amplifier device, relay means having contacts connected to be activated by current flowing in the output electrode of said first amplifier to perform said automatic selection in response to said foreign light source, means for supplying unidirectional voltage, a voltage divider comprising resistance effectively connected across said unidirectional voltage means, connections from electrodes of said second amplifier to said voltage divider for furnishing operating potentials to said electrodes, first and second variably adjustable sensitivity resistors included in parallel relation in the input circuit of said second amplifier, means for establishing biasing potential to said resistors for said second amplifier independent of conduction of said second amplifier circuit, one contact operated by said relay means arranged to choose one of said parallel resistors in one operable position to automatically change the sensitivity of said second amplifier for the upper and lower beam positions of the relay means contacts whereby adjustment of said resistors respectively establishes a separate threshold value for the upper and lower beam conditions, separate housing means for said photo-conductive element and said amplifiers; a coaxial electrical cable connected between said separate housing means with an inner lead connected between said photo-conductive element and an electrode of said second amplifier, a circuit connecting the photo-conductive element in said voltage divider, a circuit including part of said resistance of said voltage divider coupled between the inner and outer leads of said coaxial cable and adapted to provide a relatively low impedance path for the leakage currents, thereby reducing to a negligible value the magnitude of leakage current flowing between the inner and outer conductors of said coaxial cable and thus preventing spurious signal voltages from appearing on the grid electrode of said second amplifier.

4. An electrical control system for vehicle headlights equipped with high and low beam filaments comprising, in combination, a source of electrical energy, a three position switch for manually selecting the high and low beam filaments and for providing automatic selection of same, the three position switch including at least a single contact for each position and a contact arm cyclically movable in one direction to each position, means for electrically connecting the movable contact arm to the source of electrical energy, means electrically connecting the high beam filaments to one of the contact positions, means electrically connecting the low beam filaments to the next successive cyclical position from the high beam contact position, and an electrical control circuit for automatic selection of the high and low beam filaments and electrically connected to the third successive contact position thereby rendering the control circuit operative when the switch is in said third successive position of its movement.

5. In a system for operating a headlamp having high and low beam filaments, a source of power for said filaments, means for supplying unidirectional voltage, a voltage divider comprising resistance effectively connected across said voltage means, and including a light responsive photo-conductive element characterized by a change in conductivity in response to impingement of radiant light energy, a first amplifier having anode, cathode, and grid electrodes connected to the voltage divider for furnishing operating potentials to said electrodes and in parallel arrangement with said light responsive circuit, said first amplifier connected to said photo-conductive element for response to variations of conductivity of said element, a second amplifier having anode, cathode, and grid electrodes, a circuit coupling the anode electrode of said first amplifier to the grid electrode of said second amplifier, relay means connected to be activated by current flowing in the anode circuit of said second amplifier, separate housing means for said photo-conductive element and said amplifiers and adapted to be situated at a distance from each other, a coaxial electrical cable connected between said separate housing means, with an inner conductor thereof connected between said photo-conductive element and an electrode of said first amplifier, and a resistor connected in the voltage divider circuit and between the outer and inner conductors of said coaxial cable and proportioned to provide a relatively low impedance path for the leakage currents, thereby reducing to a negligible value the magnitude of leakage current flowing between the inner and outer conductors of said coaxial cable and thus preventing spurious signal voltages from appearing on the grid electrode of said first amplifier.

References Cited in the file of this patent

UNITED STATES PATENTS

| | | |
|---|---|---|
| 2,476,389 | Schmidt, Jr. | July 19, 1949 |
| 2,558,969 | Le Croy | July 3, 1951 |
| 2,560,748 | Silva | July 17, 1951 |
| 2,632,040 | Rabinow | Mar. 17, 1953 |
| 2,679,616 | Onksen, Jr. | May 25, 1954 |
| 2,767,347 | Miller et al. | Oct. 16, 1956 |